(12) United States Patent
Simkowiak

(10) Patent No.: US 12,271,330 B2
(45) Date of Patent: Apr. 8, 2025

(54) SPATIALLY INDEXED TWO-LINE DATA BUS

(71) Applicant: Derek Simkowiak, Lynnwood, WA (US)

(72) Inventor: Derek Simkowiak, Lynnwood, WA (US)

(73) Assignee: Holding Zero, LLC, Albuquerque, NM (US)

( * ) Notice: Subject to any disclaimer, the term of this patent is extended or adjusted under 35 U.S.C. 154(b) by 92 days.

(21) Appl. No.: 18/349,698

(22) Filed: Jul. 10, 2023

(65) Prior Publication Data

US 2024/0012776 A1    Jan. 11, 2024

Related U.S. Application Data

(60) Provisional application No. 63/359,243, filed on Jul. 8, 2022.

(51) Int. Cl.
*G06F 13/40* (2006.01)

(52) U.S. Cl.
CPC ................... *G06F 13/4022* (2013.01)

(58) Field of Classification Search
CPC ................................... G06F 13/4022
See application file for complete search history.

(56) References Cited

U.S. PATENT DOCUMENTS

| | | | |
|---|---|---|---|
| 2016/0085479 A1* | 3/2016 | Edmiston | H04J 3/0697 711/154 |
| 2020/0349233 A1* | 11/2020 | Patterson | G06F 30/00 |

FOREIGN PATENT DOCUMENTS

| | | | | |
|---|---|---|---|---|
| CN | 112083472 A | * | 12/2020 | G01V 1/008 |

OTHER PUBLICATIONS

Translation of CN-112083472-A (Year: 2020).*

* cited by examiner

*Primary Examiner* — Henry Tsai
*Assistant Examiner* — John B Roche
(74) *Attorney, Agent, or Firm* — Kameron W. Kramer

(57) ABSTRACT

The invention addresses individual electronic components on a shared communication bus by using spatial indexing to route data based on the physical location of the electronic components. The spatially indexed two-line data bus maps a spatial grid to a plurality of indexed connection points, which are geometrically arranged in physical space, to a set of electrically conductive grid lines. The grid lines form a communication network which can be connected to electronic components physically located on the mapped spatial grid. In the preferred embodiment, the grid lines are comprised of copper traces on a printed circuit board (PCB). In another embodiment, the grid lines are comprised of connecting wires. The electronic components are connected electrically in parallel with the grid lines.

19 Claims, 4 Drawing Sheets

SPATIALLY INDEXED TWO-LINE DATA BUS

CROSS-REFERENCE TO RELATED APPLICATIONS

This application claims the benefit of U.S. Provisional Patent Application Ser. No. 63/359,243 filed Jul. 8, 2022, titled "SPATIALLY INDEXED TWO-LINE DATA BUS," and the subject matter thereof is incorporated herein by reference thereto.

TECHNICAL FIELD

The present disclosure relates to a data bus. More particularly, the present disclosure relates to the structural, electrical, and timing aspects of a spatially indexed two-line data bus.

BACKGROUND ART

The present disclosure describes a two-line data bus for communication with a plurality of identical electronic components arranged geometrically in physical space. For example, high-density printed circuit board component arrays, digital sensor networks, multi-cell battery chargers, clothing with integrated sensors or lights, computing clusters, or display screens.

Many digital two-line protocols, such as Inter-Integrated Circuit, I2C, SMBus, PMBus, "I2C-compatible", and Two-Wire Interface, prefix data messages with an address, which is used to route data to the correct integrated circuit (IC). If two ICs have been assigned the same address, they cannot be on the same two-line data bus, because data cannot be routed correctly. This is known as an address conflict. Many ICs have permanent device addresses which are set at the factory and cannot be changed, making it impossible to connect more than one of them to the same two-line bus. Furthermore, many unaddressed digital protocols which use a clock line and a data line, such as Serial Peripheral Interface (SPI), require the use of a third "chip select" line to prevent conflicts on a two-line data bus. Thus, an improved two-line data bus is required which reduces or removes one or more of the issues mentioned.

None of the prior art fully addresses the problems resolved by the present invention. The present invention overcomes these limitations contained in the prior art.

Certain embodiments of the invention have other steps or elements in addition to or in place of those mentioned above. The steps or element will become apparent to those skilled in the art from a reading of the following detailed description when taken with reference to the accompanying figures, if any.

DETAILED DESCRIPTION OF THE INVENTION

Figure 1:
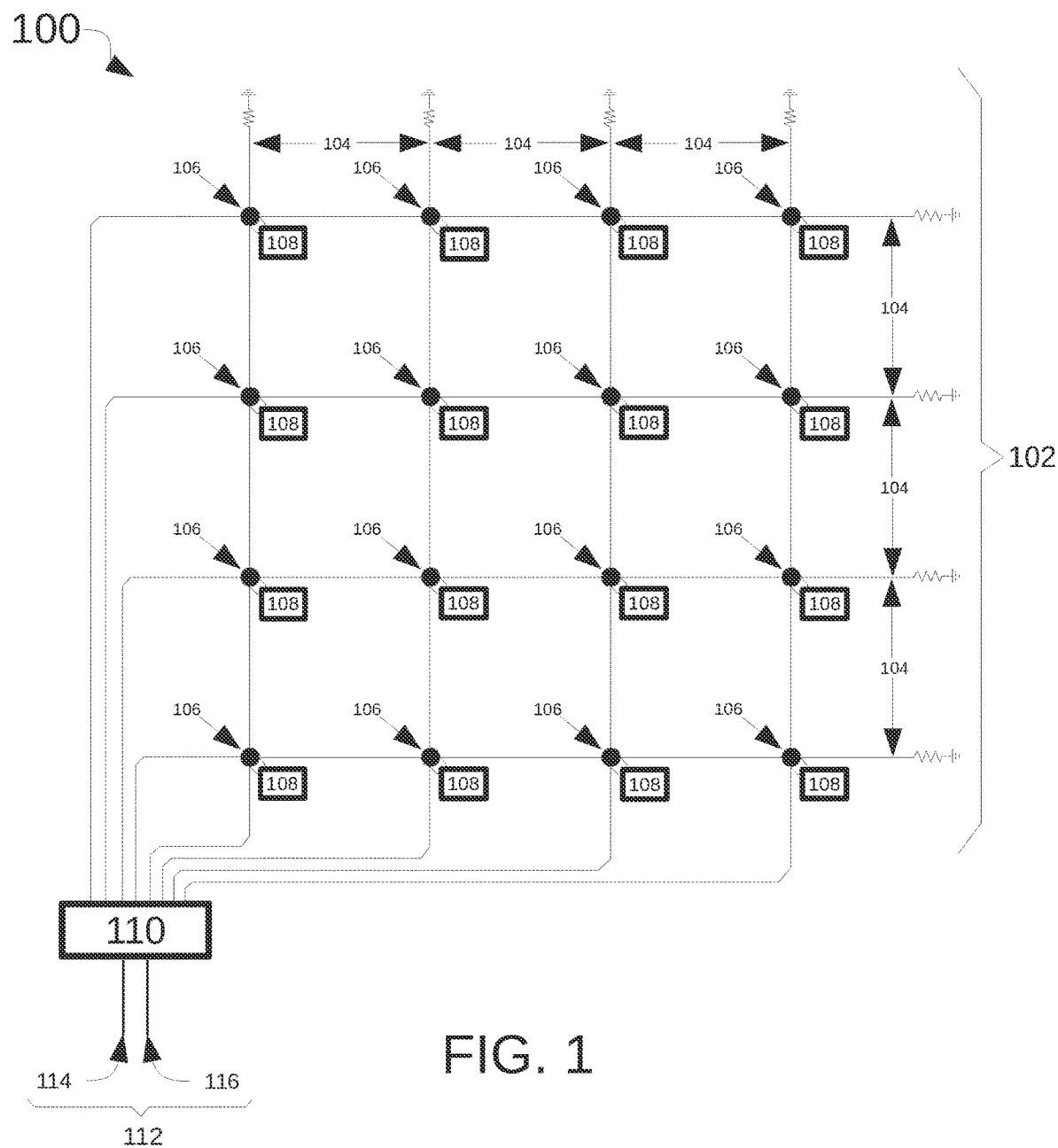
FIG. 1 illustrates a simplified schematic of a spatially indexed two-line data bus, according to certain embodiments of the invention.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system, if any, are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures, if any. The term "on" means that there is direct contact among elements.

The words "including", "comprising", "incorporating", "consisting of", "have", and "is" are meant to be non-exclusive, meaning additional items, components or elements may be present. Joinder references such as "connected", "connecting", and "coupled" do not limit the position, orientation, or use of systems and/or methods, and do not necessarily infer that two elements are directly connected. All identifying numerical terms are for identification only, and do not refer to the order or preference of any element, embodiment, variation and/or modification.

The present disclosure provides a spatially indexed two-line data bus comprising a spatial grid in two or three physical dimensions; one or more electrically conductive grid lines contiguous with the first dimension of the spatial grid; one or more electrically conductive grid lines contiguous with the second and third dimensions of the spatial grid; one or more indexed connection points on the spatial grid, such that electronic components may be electrically connected to two or more grid lines at the one or more indexed connection points; a media access controller comprising a means for dynamically selecting the indexed connection points for media access to one or more communicated two-line signals; a first bus connector; and a second bus connector.

The present disclosure further provides a method of assembling a spatially indexed two-line data bus, the method comprising positioning two or more electrically conductive grid lines contiguous with a spatial grid of two or three dimensions; positioning a media access controller; positioning a first bus connector; positioning a second bus connector; coupling the media access controller to the grid lines, the media access controller to the first bus connector, and the media access controller to the second bus connector. The method of the present invention further comprises positioning one or more additional electrical connectors; coupling the media access controller to the additional electrical connectors; positioning one or more additional electrical components; and coupling the electronic components to the additional electrical connectors.

The present disclosure provides individual electronic components on a shared communication bus by using spatial indexing to route data based on the physical location of the electronic components. The spatially indexed two-line data bus maps a spatial grid to a plurality of indexed connection points, which are geometrically arranged in physical space, to a set of electrically conductive grid lines. The grid lines form a communication network which can be connected to electronic components physically located on the mapped spatial grid. In the preferred embodiment, the grid lines are comprised of copper traces on a printed circuit board (PCB). In another embodiment, the grid lines are comprised of connecting wires.

The electronic components are connected electrically in parallel with the grid lines. Each grid line connects many devices, and an indexed connection point on one of said grid lines defines a physical location in one dimension (such as width or height) in the spatial grid.

FIG. 1 illustrates a simplified schematic of a spatially indexed two-line data bus 100, according to certain embodiments of the invention. The spatially indexed two-line data bus 100 dynamically selects which electronic component 108 to communicate two-line signals 204 with, by selecting which pair of grid lines 104 to use for communication. Although there may be a large number of grid lines 104, only one combination of two of said grid lines 104 are ever selected to be electrically active at the same time. During data transmission, many electronic components 108 will sense the first signal, and many electronic components 108 will, separately, sense the second signal, but only one electronic component 108 will sense both signals 204 simultaneously, and thus transmit or receive the data. Thus, one electronic component 108 out of many can be selected and addressed electrically by the bus, even if the electronic components 108 have conflicting protocol addresses, or no protocol addressing. Both the spatial index 202 and the spatial grid coordinate 200 of an electronic component 108 need not be programmed or transmitted to said electronic component 108, making the invention backwards compatible with many existing two-line protocols and electronic components 108.

The present disclosure's spatial indexing is implemented by electrically connecting the two bus connectors 112 to the two grid lines 104 which intersect at the desired spatial grid coordinate 200. The number of grid lines 104 for each grid dimension determines the possible number of indexed connection points 106 in the spatial grid 102. Any number of grid lines 104 can be used to customize the 2D or 3D dimensional layout and density of the spatial grid 102.

An electronic component 108's indexed connection point 106 on the spatial grid 102 is mapped to its spatial index 202 on the two-line bus, by representing the two grid lines 104 it connects to as binary bits in a media access control (MAC) address space, as would be known to those of skill in the art. The media access controller 110 translates a spatial index 202 to the corresponding two grid lines 104 and electrically connects them to the two bus connectors 112.

In some embodiments the media access controller 110 may include one or more ICs such as a microcontroller, multiplexer, shift register, binary decoder, input/output expander, or switching IC to perform the spatial grid coordinate 200 indexing and media access control, but other embodiments are also possible. A multiplexer may multiplex, demultiplex, or both multiplex and demultiplex. The spatial index 202 is used to dynamically select an electronic component 108 for media access by communicating it to the media access controller 110. In some embodiments, the bus connectors 112 may be used to communicate spatial indexes 202 to the media access controller 110 for selection. In other embodiments, electrically conducting lines other than the bus connectors 112 may be used. In other embodiments, a memory address register may be used. Additional embodiments are also possible.

Figure 2:
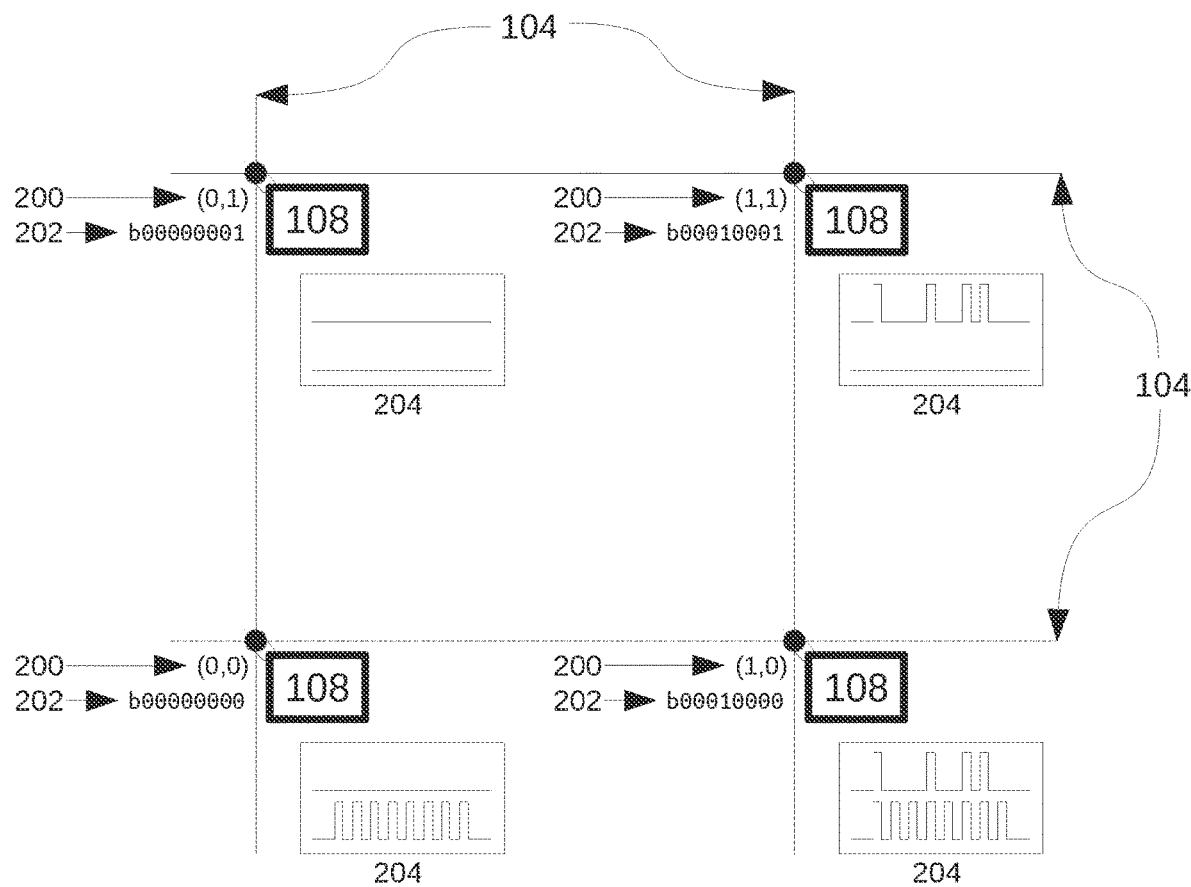
FIG. 2 illustrates a detailed view of a portion of a simplified schematic of the spatial grid, according to certain embodiments of the invention.

FIG. 2 illustrates a detailed view of a portion of a simplified schematic of the spatial grid 102, according to certain embodiments of the invention. The spatial index 202 used to select an electronic component 108 at a spatial grid coordinate 200 is numerically represented as a binary number of N bits, where N is greater than or equal to the total number of grid lines 104 on the spatial grid 102. In the preferred embodiment, each spatial index 202 is determined by having all binary bits set to zero, except for the bits which represent the two grid lines 104 of the addressed indexed connection point 106, whose bits are set to one. Thus, the bitfield of the address maps the 2D or 3D spatial grid coordinate 200 to a unique spatial index 202 which corresponds to a physical location on the electrical circuit. In some embodiments, the polarity of the binary bits may be reversed such that the selected grid lines 104 are represented by the bit zero.

In the preferred embodiment, the communicated two-line signals 204 are low-voltage digital signals of about 7 volts or less. Said digital signals are illustrated in FIG. 2 as a timeline of binary high and low values on two lines, as would be known to those of skill in the art, where both digital signals must be received simultaneously. Other embodiments may use communicated two-line analog signals, but additional embodiments are also possible.

Figure 3:
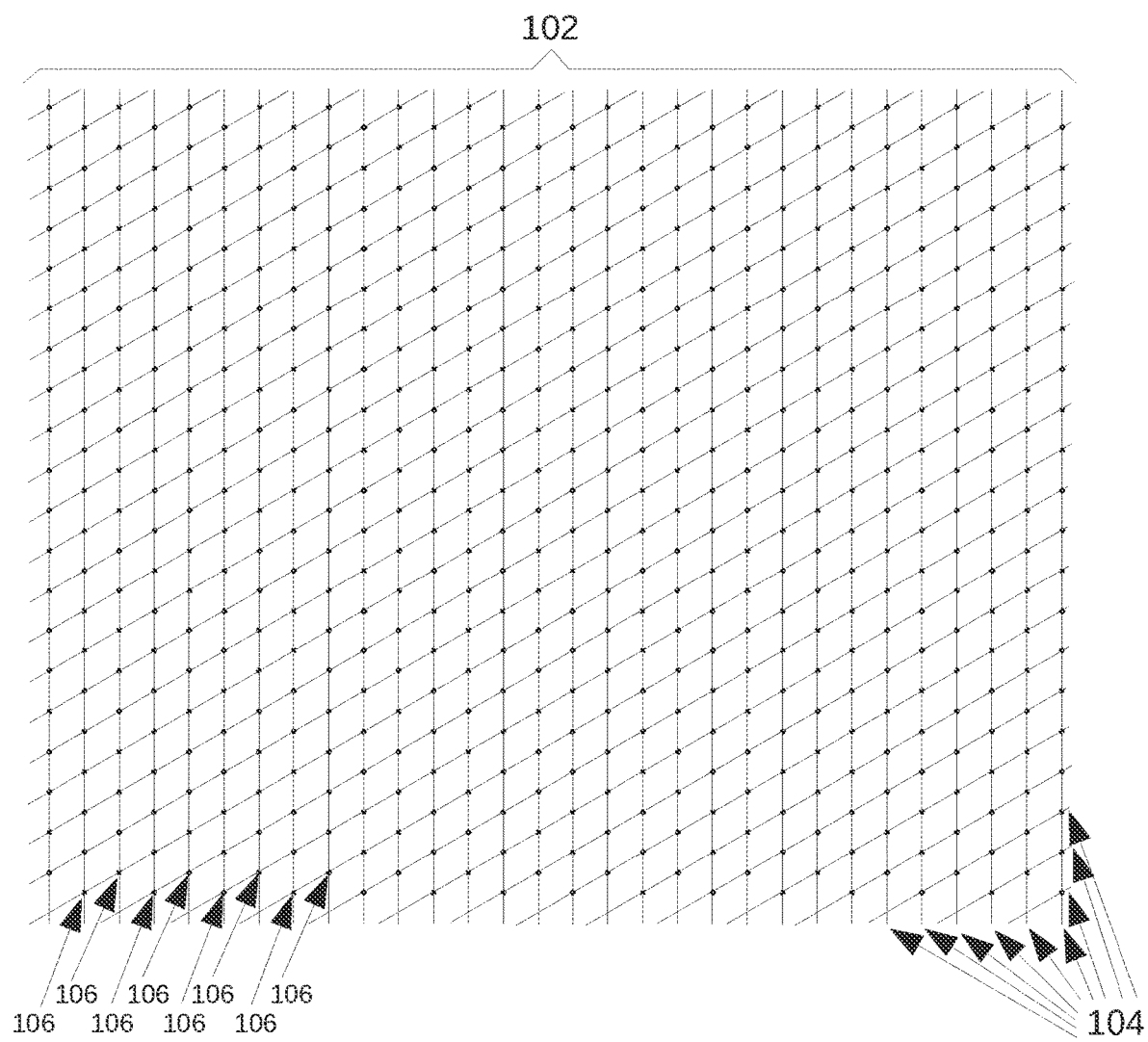
FIG. 3 illustrates a hexagonal spatial grid for a spatially indexed two-line data bus, according to certain embodiments of the invention.
Figure 4:
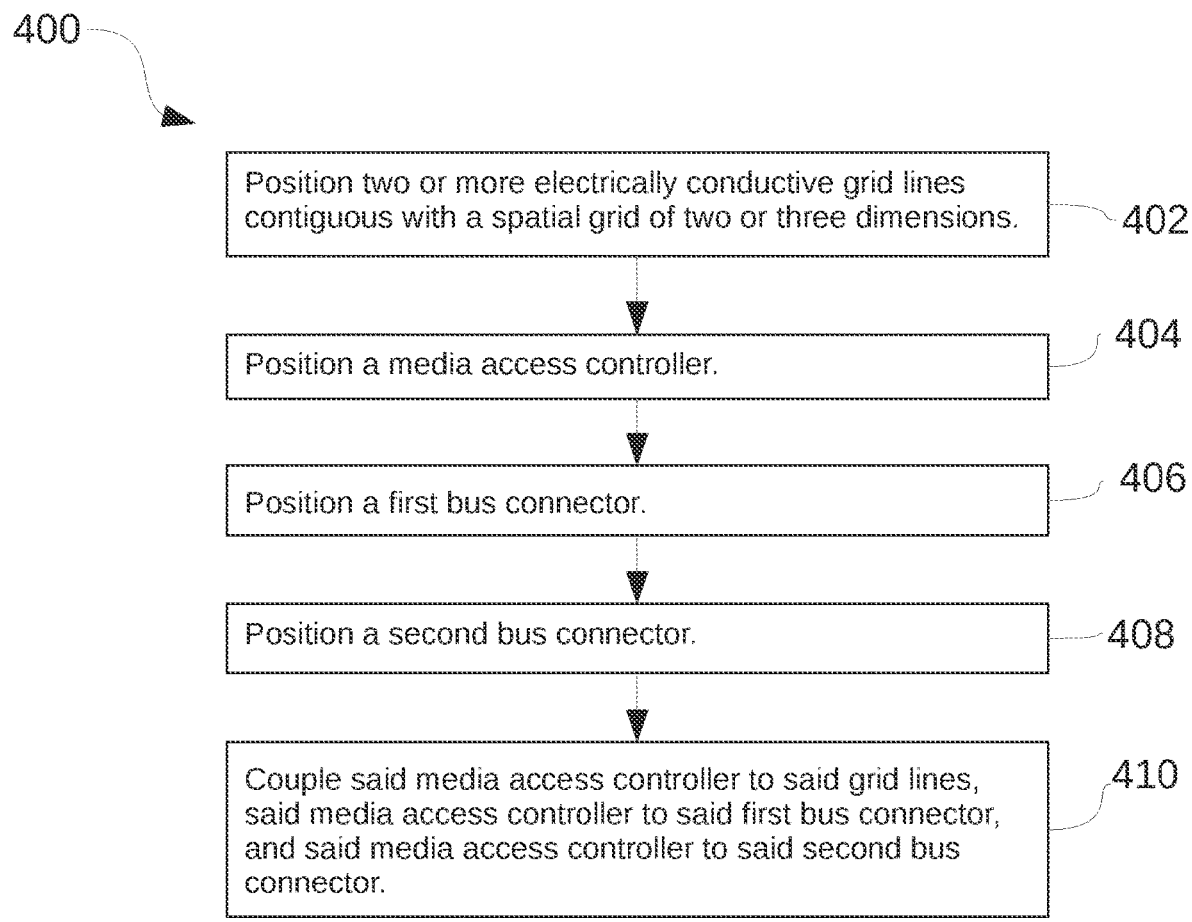
FIG. 4 illustrates a method of assembling a spatially indexed two-line data bus, according to certain embodiments, according to certain embodiments of the invention.

FIG. 3 illustrates a hexagonal spatial grid 102 for a spatially indexed two-line data bus 100, according to certain embodiments of the invention. The spatial grid 102 shape need not be symmetrical, regular, or right-angled, and can include hexagonal grids or irregular spatial mappings, such as spherical mappings, topographical mappings, a mapped layout to a clothing pattern, and other mappings in two or three physical dimensions. The preferred embodiment uses row and column indexes to select electronic components 108 on a PCB plane, but other embodiments may use cubic coordinates, axial coordinates, or any coordinate system suited for the physical layout of said electronic components 108. FIG. 4 illustrates a method of assembling a spatially indexed two-line data bus 100, according to certain embodiments of the invention. According to method 400, at step 402 two or more electrically conductive grid lines 104 are positioned contiguous with a spatial grid 102 of two or three dimensions. These may be any suitable electrical conductor such as copper circuit traces or wires, and may be positioned though a computer-assisted mechanism, as would be known to those of skill in the art, to use a datum on the spatial grid 102 to achieve substantially accurate alignment. The indexed connection points 106 occur at the intersection of two or more electrically conductive grid lines 104.

According to method 400, at step 404 a media access controller 110 is positioned. The media access controller 110 may include one or more integrated circuits or other electrical components, which may be positioned though a computer-assisted mechanism, as would be known to those of skill in the art, to use a datum on the spatial grid 102 to achieve substantially accurate alignment.

According to method 400, at step 406 a first bus connector 114 is positioned. It may be any suitable electrical conductor such as copper circuit traces or wires, and may be positioned though a computer-assisted mechanism, as would be known to those of skill in the art, to use a datum on the spatial grid 102 to achieve substantially accurate alignment.

According to method 400, at step 408 a second bus connector 116 is positioned. It may be any suitable electrical conductor such as copper circuit traces or wires, and may be positioned though a computer-assisted mechanism, as would be known to those of skill in the art, to use a datum on the spatial grid 102 to achieve substantially accurate alignment.

According to method 400, at step 410 said media access controller 110 is coupled to said grid lines 104, said media access controller 110 is coupled to said first bus connector 114, and said media access controller 110 is coupled to said second bus connector 116. These may be coupled simultaneously using reflow soldering, as would be known to those of skill in the art, or they may be individually coupled using a soldering iron or other electrical coupling technique, as would be known to those of skill in the art.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying figures are to be interpreted in an illustrative and non-limiting sense.

LIST OF ELEMENTS SHOWN ON THE DRAWINGS

100 Spatially indexed two-line data bus
102 Spatial grid
104 Grid line
106 Indexed connection point
108 Electronic components
110 Media access controller
112 Bus connectors
114 First bus connector
116 Second bus connector
200 Spatial grid coordinate
202 Spatial index
204 Communicated two-line signals
400 Method
402 Step
404 Step
406 Step
408 Step
410 Step

What is claimed is:

1. A spatially indexed two-line data bus comprising:
a spatial grid in two or three physical dimensions;
one or more electrically conductive grid lines contiguous with the first dimension of the spatial grid;
one or more electrically conductive grid lines contiguous with the second and third dimensions of the spatial grid;
one or more indexed connection points on the spatial grid, such that electronic components may be electrically connected to two or more grid lines at the one or more indexed connection points;
a media access controller comprising a means for dynamically selecting the indexed connection points for media access to one or more communicated two-line signals;
a first bus connector; and
a second bus connector.

2. The spatially indexed two-line data bus of claim 1, wherein the grid lines are comprised of copper traces of a printed circuit board.

3. The spatially indexed two-line data bus of claim 1, wherein the electronic components are comprised of integrated circuits on a printed circuit board.

4. The spatially indexed two-line data bus of claim 1, wherein the communicated two-line signals are comprised of low-voltage digital signals of about 7 volts or less.

5. The spatially indexed two-line data bus of claim 1, wherein the grid lines form regularly spaced rows and columns.

6. The spatially indexed two-line data bus of claim 1, wherein the grid lines form axes of a hexagonal grid.

7. The spatially indexed two-line data bus of claim 1, wherein the media access controller comprises a microcontroller.

8. The spatially indexed two-line data bus of claim 1, wherein the media access controller comprises a multiplexer, such that the multiplexer can multiplex, demultiplex, or both multiplex and demultiplex.

9. The spatially indexed two-line data bus of claim 1, wherein the media access controller comprises a shift register.

10. The spatially indexed two-line data bus of claim 1, wherein the media access controller comprises a binary decoder.

11. The spatially indexed two-line data bus of claim 1, wherein the media access controller comprises an input/output expander.

12. The spatially indexed two-line data bus of claim 1, wherein the media access controller comprises a switching integrated circuit.

13. The spatially indexed two-line data bus of claim 1, wherein the media access controller comprises an application-specific integrated circuit.

14. The spatially indexed two-line data bus of claim 1, wherein the means for dynamically selecting indexed connection points comprises software instructions.

15. The spatially indexed two-line data bus of claim 1, wherein the means for dynamically selecting indexed connection points comprises analog electrical signals.

16. A method of assembling a spatially indexed two-line data bus, the method comprising:
positioning two or more electrically conductive grid lines contiguous with a spatial grid of two or three dimensions;
positioning a media access controller;

positioning a first bus connector;
positioning a second bus connector;
coupling the media access controller to the grid lines;
coupling the media access controller to the first bus connector and
coupling the media access controller to the second bus connector.

17. The method of claim 16 further comprising coupling one or more electronic components to the grid lines.

18. The method of claim 16 further comprising coupling the one or more electronic components to the first and second bus connectors.

19. The method of claim 16 further comprising:
positioning one or more additional electrical connectors;
coupling the media access controller to the additional electrical connectors;
positioning one or more additional electrical components; and
coupling the electronic components to the additional electrical connectors.

\* \* \* \* \*